United States Patent
Basir

(10) Patent No.: US 8,862,158 B2
(45) Date of Patent: *Oct. 14, 2014

(54) WIRELESS DISTRIBUTION NETWORK

(75) Inventor: Otman Adam Basir, Waterloo (CA)

(73) Assignee: E-Lane Systems Inc., Waterloo, Ontario (CA)

( * ) Notice: Subject to any disclaimer, the term of this patent is extended or adjusted under 35 U.S.C. 154(b) by 77 days.

This patent is subject to a terminal disclaimer.

(21) Appl. No.: 13/418,723

(22) Filed: Mar. 13, 2012

(65) Prior Publication Data

US 2013/0065576 A1 Mar. 14, 2013

Related U.S. Application Data

(63) Continuation of application No. 11/071,561, filed on Mar. 3, 2005, now Pat. No. 8,150,381.

(60) Provisional application No. 60/549,722, filed on Mar. 3, 2004.

(51) Int. Cl.
*H04W 24/00* (2009.01)
*H04L 29/08* (2006.01)
*H04W 4/02* (2009.01)
*H04W 8/00* (2009.01)

(52) U.S. Cl.
CPC ............... *H04L 67/06* (2013.01); *H04W 4/02* (2013.01); *H04L 67/04* (2013.01); *H04W 8/005* (2013.01); *H04L 67/18* (2013.01)
USPC .................. 455/456.5; 455/456.1; 455/550.1; 455/418; 709/238

(58) Field of Classification Search
CPC . H04W 64/00; H04W 64/02; H04M 1/72519; H04L 45/00
USPC .......... 455/456.5, 456.1, 550.1, 418; 709/238
See application file for complete search history.

(56) References Cited

U.S. PATENT DOCUMENTS 6,134,454 A * 10/2000 Foladare et al. ........... 455/556.2
6,304,210 B1 * 10/2001 Allison et al. ........... 342/357.41

(Continued)

FOREIGN PATENT DOCUMENTS

EP 1037434 10/1999
EP 1139681 2/2001

(Continued)

OTHER PUBLICATIONS

"The eGasStation Architecture", Java Technology-Based Managed Services for Retail Service Stations, Sun Microsystems, Inc., pp. 1-15.

*Primary Examiner* — Danh Le
(74) *Attorney, Agent, or Firm* — Carlson, Gaskey & Olds, P.C.

(57) ABSTRACT

A wireless distribution network provides content delivery and data collection to and from portable devices. The network connects a server controlling access to content storage by home nodes, service center nodes and a plurality of wireless nodes. The wireless nodes are disposed at a plurality of locations, such as gas stations (vehicle service stations). The plurality of wireless nodes are connected to the server via the network. Each wireless node is capable of transferring information wirelessly between the node and one of a plurality of portable devices. Each node is capable of detecting and identifying each of the plurality of portable devices. Each node transfers information between the node and the plurality of portable devices based upon the detection and identification of the portable devices. The node also transfers the information between the node and the first computer based upon the detection and identification of the portable devices.

23 Claims, 1 Drawing Sheet

(56) References Cited

U.S. PATENT DOCUMENTS

| | | |
|---|---|---|
| 6,389,337 B1 | 5/2002 | Kolls |
| 6,545,596 B1 * | 4/2003 | Moon .................. 340/425.5 |
| 6,587,835 B1 | 7/2003 | Treyz et al. |
| 6,608,399 B2 | 8/2003 | McConnell et al. |
| 6,615,186 B1 | 9/2003 | Kolls |
| 6,650,997 B2 | 11/2003 | Funk |
| 6,680,694 B1 | 1/2004 | Knockheart et al. |
| 7,484,008 B1 | 1/2009 | Gelvin et al. |
| 7,920,626 B2 * | 4/2011 | Fernandez et al. ....... 375/240.16 |
| 8,000,724 B1 * | 8/2011 | Rayburn et al. ............ 455/456.3 |
| 2001/0034239 A1 * | 10/2001 | Yamato et al. ................ 455/456 |
| 2002/0065730 A1 | 5/2002 | Nii |
| 2002/0076029 A1 * | 6/2002 | Shaffer et al. ............ 379/220.01 |
| 2002/0095249 A1 | 7/2002 | Lang |
| 2002/0138350 A1 | 9/2002 | Cogen |
| 2002/0143655 A1 | 10/2002 | Elston et al. |
| 2002/0147837 A1 * | 10/2002 | Heller .......................... 709/238 |
| 2003/0013438 A1 | 1/2003 | Darby |
| 2003/0032435 A1 * | 2/2003 | Asada et al. .................. 455/456 |
| 2003/0068999 A1 | 4/2003 | Casali et al. |
| 2003/0073406 A1 | 4/2003 | Benjamin et al. |
| 2003/0074422 A1 | 4/2003 | Montemurro et al. |
| 2003/0078986 A1 | 4/2003 | Ayres et al. |
| 2003/0151592 A1 | 8/2003 | Ritter |
| 2003/0228879 A1 | 12/2003 | Witkowski et al. |
| 2004/0192195 A1 * | 9/2004 | Soga et al. ................... 455/11.1 |
| 2005/0063528 A1 * | 3/2005 | Pearson et al. ........... 379/211.01 |

FOREIGN PATENT DOCUMENTS

| | | |
|---|---|---|
| WO | 02/17654 | 2/2002 |
| WO | 02/080592 | 10/2002 |
| WO | 03/081787 | 10/2003 |

* cited by examiner

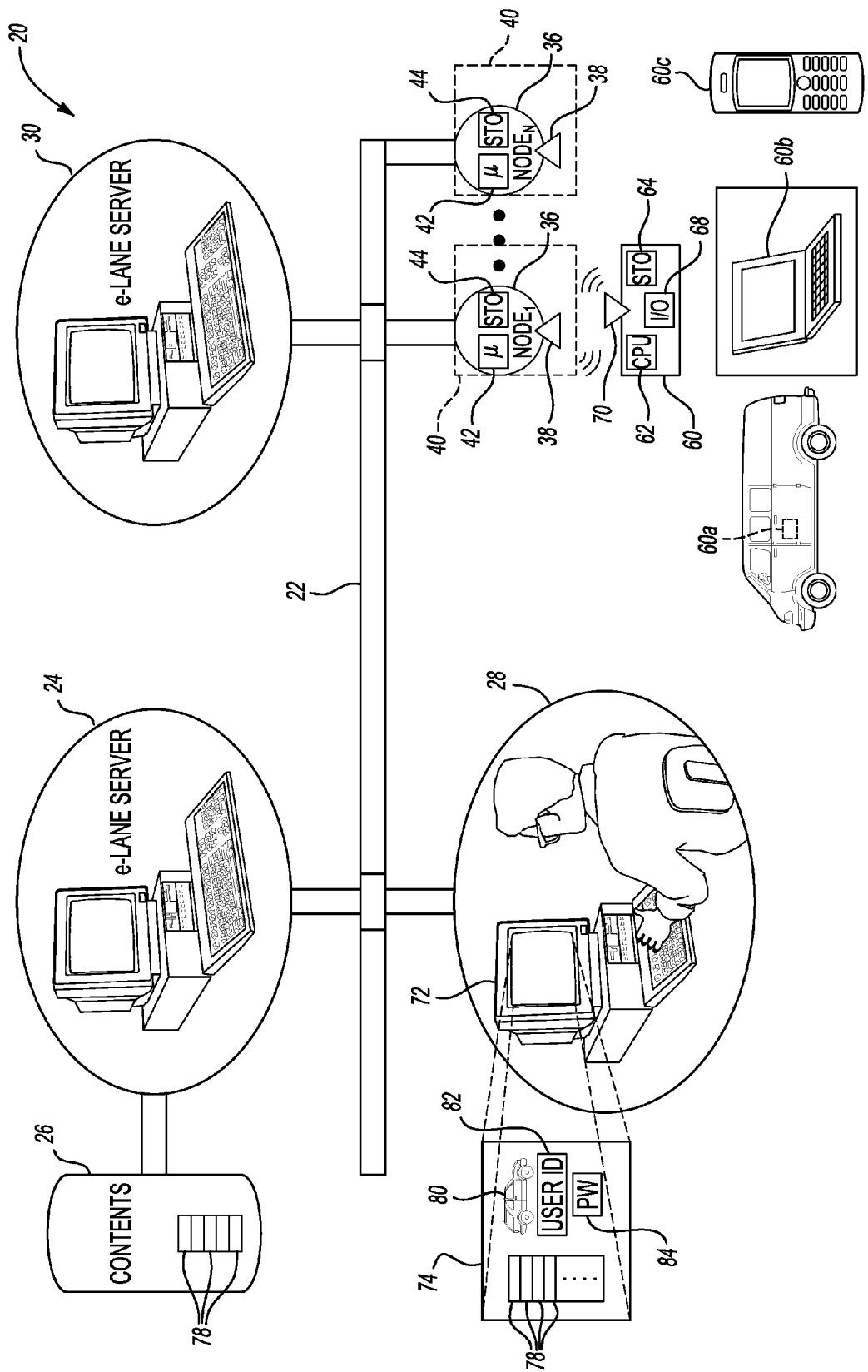

WIRELESS DISTRIBUTION NETWORK

CROSS-REFERENCE TO RELATED APPLICATIONS

This is a continuation of U.S. application Ser. No. 11/071,561 filed on Mar. 3, 2005 now U.S. Pat. No. 8,150,381, which claims priority to U.S. Provisional Application Ser. No. 60/549,722 filed Mar. 3, 2004.

BACKGROUND OF THE INVENTION

Handheld devices such as personal digital assistants (PDAs), and cell phones have entered the market successfully in North America and overseas. These carrier-based solutions are constantly expanding to include more features that deliver useful content (news, entertainment, and data) to the user. Unfortunately, carrier based systems are bogged down by high traffic and low data transfer rates and furthermore are billed at extremely high rates. Though in some cases they provide real-time delivery of content, the average user does not always require this. The average user who does not need real-time content delivery (such as real time delivery of email) currently does not have the ability to scale down the carrier-based services and is therefore stuck paying expensive recurring service bills along with the one-time cost of their device.

The proposed invention describes a distributed network comprised of nodes equipped with wireless transceivers. The distributed network itself may be formed by connecting each node to the internet or any other existing or new network infrastructure such that the terminals are able to transmit data to and from each other as the existing nodes presently do. The wireless transceivers on each network node expand the range of the newly formed network to wireless devices in the physical coverage area. Therefore, a wireless connection is provided for any wireless-equipped device within the physical range of a terminal to connect to the network. Using this type of network between terminals allows rapid content delivery or reception to and from any device equipped with the required wireless connectivity hardware.

Content delivery is performed at "terminal" locations without the need of physically connecting a wire to the network. The client devices are also equipped with wireless connectivity hardware communicate with the distributed network via the wireless connection (when physically in range). Conversely, the user may transmit data wirelessly to the terminal for use anywhere on the wired network or storage.

SUMMARY OF THE INVENTION

A wireless distribution network for content delivery and data collection to and from portable devices is provided by the present invention. The network is based around a wide-area network WAN, such as the internet, connecting a server controlling access to content storage by home nodes, service center nodes and a plurality of wireless nodes. The server is at a first location. A plurality of the wireless nodes are disposed at a plurality of locations, such as gas stations (vehicle service stations). The plurality of wireless nodes are connected to the server via the network.

Each wireless node is capable of transferring information wirelessly between the node and one of a plurality of portable devices. Each node is capable of detecting and identifying each of the plurality of portable devices. Each node transfers information between the node and the plurality of portable devices based upon the detection and identification of the portable devices. The node also transfers the information between the node and the first computer based upon the detection and identification of the portable devices.

In this manner, an efficient, simple system for transferring information between the portable devices and a server is provided.

BRIEF DESCRIPTION OF THE DRAWINGS

Other advantages of the present invention can be understood by reference to the following detailed description when considered in connection with the accompanying drawings wherein:

FIG. 1 schematically illustrates the distribution network according to the present invention.

DETAILED DESCRIPTION OF THE PREFERRED EMBODIMENTS

A wireless distribution network 20 for content delivery and data collection to and from portable devices 60 is shown schematically in FIG. 1. The network 20 is based around a wide-area network WAN 22, such as the internet, connecting a server 24 (which may comprise a group of servers) controlling access to content storage 26 by home nodes 28 (one shown), service center nodes 30 (one shown) and a plurality of wireless nodes 36.

Each wireless node 36 is connected to the WAN 22 at its location 40. The locations 40 are preferably gas stations because vehicles travel to and stop at gas stations on a fairly regular basis. Even during long trips away from home, the vehicle must stop at gas stations 40 periodically during which time information may be exchanged between the portable device 60 and the server 26.

The wireless node 36 includes a processor 42 and associated memory, software and hardware to perform the functions described herein. Storage 44, such as a hard drive and/or optical or other media is provided at each wireless node 36. The storage 44 includes identification of the specific wireless node 36 on which it is located, including the location of the wireless node 36. The storage 44 may also include specific, locally-relevant data such as maps of the surrounding area, available hotels, restaurants, etc. specific to the location 40 and surrounding area. The storage 44 may also include advertising to be displayed, played or otherwise presented to the user on the portable device 60. The fees for the advertising may assist in defraying the cost of the system or the service for the user. The advertising could be geographically specific, such that each wireless node 36 stores at least some advertising that is specific to the surrounding geographic area of its location 40.

The wireless node 36 further includes a transceiver 38 for creating a wireless access point to the WAN 22. The transceiver 38 may use known wireless network communication standards such as 802.11, but preferably uses Bluetooth. The Bluetooth connection is secure and has a limited range, which effectively limits the use of the wireless node 36 to the location 40, which in this example is a gas station 40.

A plurality of portable devices 60 each include a processor 62, storage 64 and input/output devices 68. The storage 64 can be memory and/or a hard drive or other storage media. The portable devices 60 further each include a transceiver 70 complementary to the transceiver 38 at each wireless node 36. The portable device 60 may be installed in a vehicle 60a, or may be a portable computer 60b, or cell phone/PDA 60c, but in this example the portable device 60 will be described as installed in a vehicle 60a. It is expected that multiple types of devices, such as computers 60b, cellphone/PDAs 60c, etc would be able to connect to the network 20. In a vehicle 60a, the device 60 could be integrated with the vehicle's entertainment system, navigation systems, email system and other vehicle information systems.

The home node 28 includes a home computer 72 connected to the WAN 22 and able to access the server 24 via the WAN 22.

In use, on the display 74 of the computer 72, the user can choose from various content 78 stored on server storage 26, such as audio content (mp3s or other compressed audio formats), local area maps, car-tones, ring-tones, advertising, coupons, email or movies for an in-vehicle entertainment system. The user chooses from among the content 78, such as by dragging the content 78 to a vehicle icon 80 on the display 74. The user logs into the server 24 via the home computer 72 and WAN 22 by entering a user id 82 and password 84. A credit card associated with the account is charged for the content 78 selected by the user. The account is also associated with a specific portable device 60 (e.g a specific vehicle 60a), or a plurality of specific portable devices 60, owned by the user.

When the portable device 60 comes within range of one of the wireless nodes 36, the wireless node 36 identifies the specific portable device 60 via wireless communication via transceivers 38, 70, and by referencing the server 24 via the WAN 22. The wireless node 36 then determines whether there is any content 78 waiting to be downloaded to the portable device 60. If so, the content 78 is downloaded to the storage 44 on the wireless node 36 and then transferred to the storage 64 on the portable device 60 via transceivers 38, 70. Again, Bluetooth is preferred and has identification and transfer standards that would be followed.

Additionally, the wireless node 36 determines whether there is any information to be uploaded from the portable device 60 to the server 24. For example, the portable device 60 may temporarily store email/SMS to be sent, vehicle usage data, a vehicle ID (for non real-time tracking) and financial transaction data in storage 64. The vehicle usage data may include information relevant to pay-as-you-drive vehicle insurance arrangements, such as the locations the vehicle has been driven, the distance the vehicle has driven, the speed the vehicle has driven, etc. This data in particular does not need to be transferred on a real-time basis. Periodic updates are sufficient.

Each location 40 may also include a service center 30, which is a public computer connected to the server 24 via the WAN 22. At the service center 30, the user can log into their account and make additional selections of content 78 or adjust other preferences and settings for their account. This content 78 may be downloaded to the vehicle 60a by the wireless node 36 at that location 40 before the user leaves the location 40.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for transferring information between a first computer at a first location and a portable device at a stationary node at a second location, the method including the steps of:
   a) moving the portable device toward the second location, wherein the portable device is located in a vehicle;
   b) detecting the presence of the portable device proximate the second location;
   c) identifying the portable device at the second location;
   d) transferring the information between the first computer and the stationary node across a wide-area network;
   e) transferring the information between the stationary node and the portable device in response to said steps b) and c); and
   transmitting data from the portable device to the stationary node.

2. The method of claim 1 wherein said step d) is performed after said step e).

3. The method of claim 1 wherein said step d) is performed before said step e).

4. The method of claim 3 further including the step of selecting the information using a second computer at a third location.

5. The method of claim 4 further including the step of authorizing at the second computer the transmission of the information to the portable device.

6. The method of claim 5 further including the step of paying for the information using the second computer.

7. The method of claim 1 wherein said step e) is performed by transmitting the information wirelessly between the stationary node and the portable device.

8. The method of claim 7 wherein the information is transmitted via Bluetooth in said step e).

9. The method of claim 1 further including the step of transmitting the data from the stationary node to the first computer.

10. The method of claim 9 wherein the data includes email.

11. The method of claim 1 wherein the information includes audio files.

12. The method of claim 1 wherein the second location is a gas station.

13. The method of claim 1 wherein said step d) is performed after said step e) and wherein the information is transmitted from the portable device to the stationary node in said step e).

14. The method of claim 13 wherein the information includes vehicle data.

15. The method of claim 13 wherein the information includes email.

16. The method of claim 1 further including the step of transmitting data from the stationary node to the portable device.

17. The method of claim 16 further including the step of transmitting the data from the first computer to the stationary node.

18. A system for transferring information comprising:
   a first computer at a first location;
   a plurality of stationary nodes at a plurality of locations, the plurality of stationary nodes connected to the first computer via a network; and
   each stationary node including a wireless transfer device for transferring information wirelessly between the stationary node and one of a plurality of portable devices, the portable device is located in a vehicle, each stationary node capable of detecting and identifying each of the plurality of portable devices and transferring information between the stationary node and the plurality of portable devices based upon the detection and identification of the portable devices, the stationary node transferring the information between the stationary node and the first computer based upon the detection and identification of the portable devices, wherein data is transmitted from the portable device to the stationary node.

19. The system of claim 18 wherein each of the plurality of locations is a gas station.

20. The system of claim 19 wherein the wireless transfer device is a Bluetooth transceiver.

21. The system of claim 18 further including a second computer on the network, the second computer capable of selecting the information on the first computer to be transferred to an associated one of the plurality of portable devices.

22. The system of claim 21 wherein the first computer stores a plurality of accounts, each associated with at least one of the plurality of portable devices, the second computer accessing an associated one of the plurality of accounts, selecting the information and initiating the transfer of the information to the associated one of the plurality of portable devices via the network and the plurality of stationary nodes.

23. A system for transferring information comprising:
a first computer at a first location;
a plurality of nodes at a plurality of locations, the plurality of nodes connected to the first computer via a network;
each node including a wireless transfer device for transferring information wirelessly between the node and one of a plurality of portable devices, each node capable of detecting and identifying each of the plurality of portable devices and transferring information between the node and the plurality of portable devices based upon the detection and identification of the portable devices, the node transferring the information between the node and the first computer based upon the detection and identification of the portable devices; and
a second computer on the network, the second computer capable of selecting the information on the first computer to be transferred to an associated one of the plurality of portable devices, wherein the first computer stores a plurality of accounts, each associated with at least one of the plurality of portable devices, the second computer accessing an associated one of the plurality of accounts, selecting the information and initiating the transfer of the information to the associated one of the plurality of portable devices via the network and the plurality of nodes, and the first computer tallies a cost for the information selected at the second computer and associates the cost with the associated one of the plurality of accounts in response to the initiation of the transfer of information to the associated one of the portable devices.

* * * * *